United States Patent Office 3,426,644
Patented Feb. 11, 1969

3,426,644
PANTOGRAPH MILLING MACHINE HAVING A WORKPIECE SUPPORTING TABLE AND A TEMPLATE SUPPORTING TABLE IS PROVIDED WITH CONNECTION
Arrigo Pecchioli, Via di Scandicci 223, Florence, Italy
Filed Jan. 31, 1967, Ser. No. 612,977
Claims priority, application Italy, Feb. 4, 1966, 2,494/66
U.S. Cl. 90—13.1
Int. Cl. B23c 1/16, 1/18; B23d 7/08
9 Claims

ABSTRACT OF THE DISCLOSURE

A pantograph milling machine having a workpiece supporting table and a template supporting table is provided with connection means for interconnecting the two tables. The interconnection means permits the tables to be adjusted relatively to one another and thereafter directly interconnects the two tables for interdependent horizontal movement and yet still permits free relative vertical movement.

---

The present invention relates to a copy milling machine and more particularly to an interconnection system for the tables of a pantograph milling machine.

The present invention provides a pantograph milling machine including two movable tables, one being a workpiece-supporting table and the other being a template-supporting table, connection means for controlling the horizontal movement of one of the tables in direct response to movement of the other, two transversely and vertically adjustable supports, of which one carries the workpiece-supporting table for movement in its own plane, and the other carries the template-supporting table for free horizontal movement thereon, in mutually perpendicular guides, after the release of stops by operation of which it is locked to the support, and wherein said connection means includes a vertical sliding coupling directly interconnecting the two tables for interdependent horizontal movement.

The present invention further provides a copy milling apparatus including a base, first and second support means each movable in a substantially lateral and vertical direction with respect to said base, a first and a second table, the first table being mounted on said first support means and the second table being engaged with the second support means for movement horizontally in the lateral direction and a longitudinal direction, and connection means for preventing relative movement between the tables except in the vertical direction.

Figure 1:
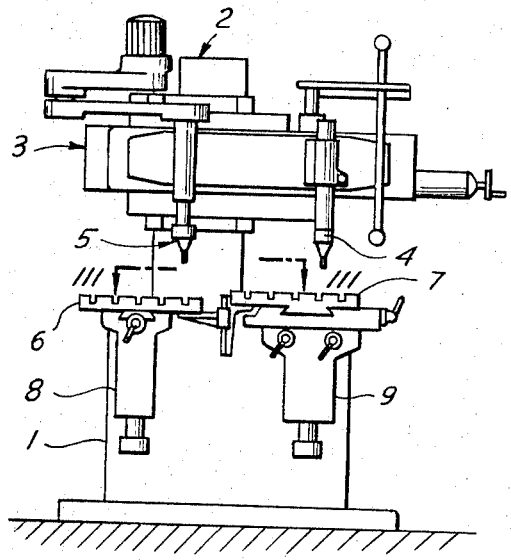
Figure 2:
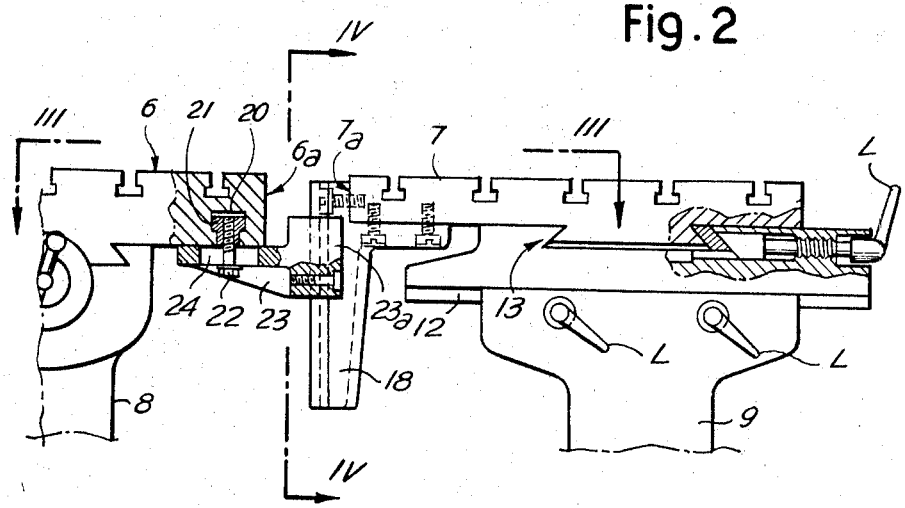
Figure 3:
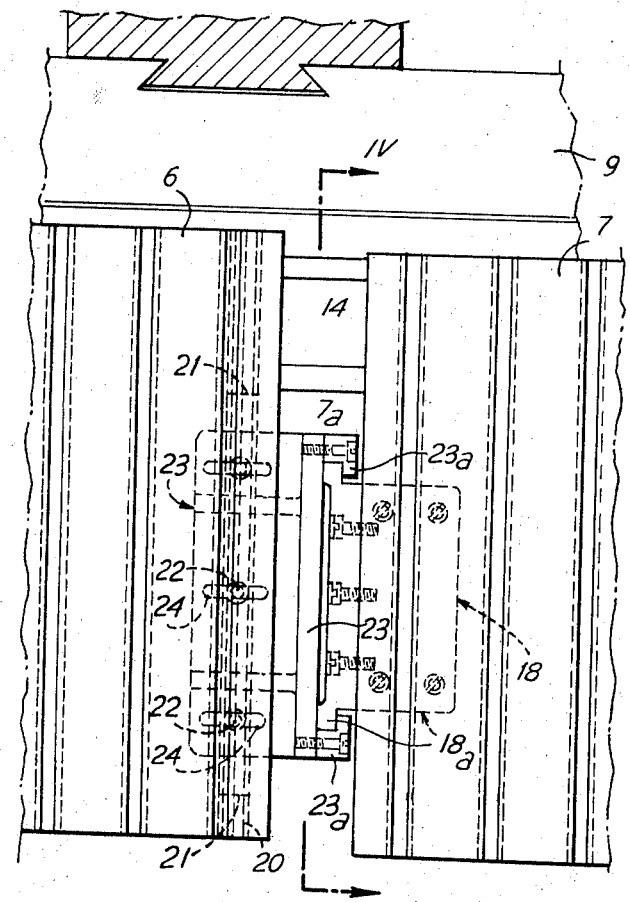
Figure 4:
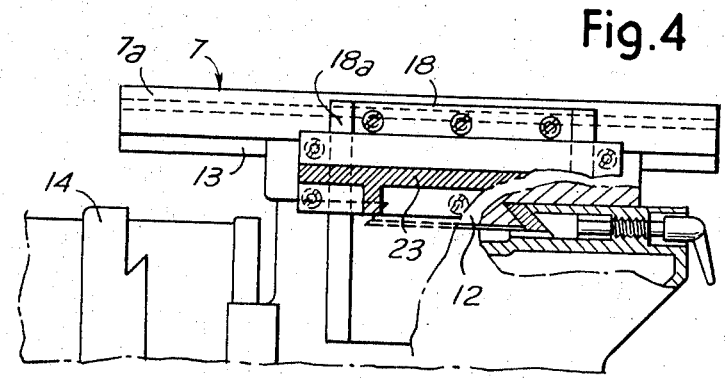

An embodiment of an interconnection system for the tables of a pantograph milling machine in accordance with the invention, will now be described by way of example, with reference to the accompanying diagrammatic drawing in which:

FIGURE 1 shows a general view of a pantograph copy milling machine;
FIGURE 2 shows a fragmentary partially-sectioned side view of the connection system between two of the machine tables;
FIGURE 3 shows a partial view taken along the line III—III of FIGURE 2; and
FIGURE 4 shows a fragmentary partially sectioned view taken along the line IV—IV of FIGURE 3.

As shown in FIGURE 1 the base 1 of a pantograph milling machine supports a vertical column 2 on which the pantograph system structure 3 is borne. The structure 3 carries a feeler stylus 4 and a tool-holder 5. The base 2 additionally supports a first table 6 and a second table 7 on which a workpiece and a template can be positioned respectively. The table 6 is mounted on a bracket 8 and is transversally movable thereon. The bracket 8 is in its turn movable both longitudinally and vertically. The table 7 is slidably mounted on a cross-slide member 11, and had guides 13 engaging with the member. The member 11 is in turn slidably mounted on a bracket 9 and has guides 12 engaging with the bracket. The bracket 9 itself is movable in a similar manner to the bracket 8. The table 7 can either move freely with respect to the bracket 9 or be locked thereto, dependent on whether locking levers L are in a free or locked position.

Thus the table 7 has guides 13 which enable horizontal movement of the table 7 with respect to the cross-slide member 11 along afixed path and cross-slide member 11 has guides 12 which enable horizontal movement of the cross-slide member 11 with respect to the bracket 9 in a direction normal to the fixed path. The base L has guides 14 to enable horizontal movement of a base structure carrying the vertical guide means for the brackets 8 and 9.

The table 7 has additionally a slide member 18 having guide edges 18a projecting therefrom adjacent the side 7a of table 7, which side is adjacent the table 6.

The edge portion 6a of the table 6, which edge portion is adjacent the table 7, has on its underside a T-shaped guide 20, in which there is arranged a correspondingly shaped slide member 21. Bolts 22 engaged with the slide member 21 support the body 23 of a stirrup slidably engaged with the slide member 18 for vertical movement. The body 23 is fitted with bolted on pieces 23a, which form guide channels in which the corresponding edges 18a projecting from the slide member 18 engage. The body 23 is fitted with a series of slots 24, which lie normal to the edge portion 6a and through which the bolts 22 pass. Thus the body 23 of the stirrup may be adjustably positioned with respect to the table 6, in a direction parallel to the edge portion 6a by sliding the slide member in the guide 20 and in a direction normal to the edge portion 6a by sliding the body 23 of the stirrup with respect to the bolts 22 engaging loosely in the slots 24. When the table 6 is in the desired position with respect to the body 23 the bolts 22 are tightened, thereby locking one to the other.

Once the bolts 22 have been secured no relative movement between the tables 6 and 7 in the horizontal plane can take place, but relative vertical movement can still take place. Thus in a locked condition any horizontal movement of the table 6 is accompanied by an equal horizontal movement of the table 7 while the guides 12 and 13 prevent any angular rotation of the table 7 (other than possible small angular movement resulting from any peripheral strain to which the table 7 could be subjected). The guides 12 and 14 may also be used for initially setting up the table 7 before beginning the machining.

In the arrangement described movement of the second table takes place without angular play thereof, which in previously proposed systems, where an auxiliary table was used to interconnect the two tables and where no means were provided to oppose angular movement of one or other of the tables, would otherwise result. Thus present arrangement avoids equiping the milling machine with the auxiliary table required in previously proposed devices. In addition the described arrangement enables initial independent positioning of the second table, to take place in guides to which it is limited when entrained in the horizontal plane. In addition the second table can be vertically offset with respect to the first table. After the initial positioning has been completed, and in order to eliminate possibility of play the stirrup and the slide member are locked with respect to the second table and the stirrup is also locked to the first table.

I claim:
1. In a pantograph milling machine including,
two tables one being a workpiece-supporting table and the other a template-supporting table,
a base,
two supports mounted for vertical and transverse movement on the base one support carrying the workpiece-supporting table for movement in its own plane and the other support carrying the template-supporting table,
the novel combination comprising,
two mutually perpendicular guides mounting the template-supporting table for free horizontal movement on its support,
stops operative for locking the template-supporting table with respect to its support, and
connection means including,
a vertical sliding coupling directly interconnecting the two tables for interdependent horizontal movement and free relative vertical movement.

2. A machine according to claim 1 wherein vertical sliding coupling is formed by a slide member rigid with one table and corresponding guide means securable to the other table.

3. A machine according to claim 2 including,
means adjustably movable in two mutually perpendicular directions in a horizontal plane for securing said guide means.

4. A machine according to claim 3 wherein said connection means includes,
a slider,
means securing said slider to one table for movement along a fixed path thereunder,
a body member forming at least part of said guide means, and
securing members passing through slots in said body member for securing said body member to the slider and releasable to permit relative movement between the said slider and said body member in a direction normal to said fixed path.

5. In a copy milling machine including,
a base,
first support means mounted on said base for movement in substantially lateral and vertical directions with respect to the base,
second support means mounted on said base for movement in substantially lateral and vertical directions with respect to the base,
a first table mounted on the first support means, and
a second table,
the novel combination comprising,
means mounting the second table on the second support means for horizontal movement in the said lateral direction and a direction normal thereto, and
connection means interconnecting the tables and constraining one said table to follow horizontal movement of the other said table but permitting relative vertical movement between the tables.

6. Apparatus according to claim 5 including,
means for connecting means adjustably movable in a horizontal plane for securing said connecting means with respect to said first table.

7. Apparatus according to claim 6 wherein said connecting means includes,
a body member,
means for securing said body member to said first table, and
a slide member rigid with said second table and slidably engaged with the body member for relative vertical movement.

8. Apparatus according to claim 7 wherein said connecting means further includes,
a slider slidably engaged with said first table for movement in said normal direction, and
securing members for securing said slider with respect to said body member to lock said body member to said first table.

9. Apparatus according to claim 8 wherein said securing members engage in slots in said body member to enable relative lateral movement between said guide member and said body member when said body member and said table are not interlocked.

References Cited

UNITED STATES PATENTS 3,117,495   1/1964   Zwick _____ 90—13.1

GERALD A. DOST, *Primary Examiner.*

U.S. Cl. X.R.

90—58